(12) United States Patent
Albrecht et al.

(10) Patent No.: US 7,215,506 B2
(45) Date of Patent: May 8, 2007

(54) HARD DISK DRIVE (HDD) ASSEMBLY OF SMALL FORM-FACTOR HDD SHOCK-MOUNTED IN FRAME HAVING DIMENSIONS OF LARGER FORM-FACTOR HDD

(75) Inventors: David W. Albrecht, San Jose, CA (US); Akihiko Aoyagi, San Jose, CA (US); Fu-Ying Huang, San Jose, CA (US); Tomokazu Ishii, Hiratsuka (JP); Qinghua Zeng, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 394 days.

(21) Appl. No.: 10/882,445

(22) Filed: Jun. 30, 2004

(65) Prior Publication Data

US 2006/0002004 A1 Jan. 5, 2006

(51) Int. Cl.
*G11B 17/00* (2006.01)
*G11B 33/14* (2006.01)
*G11B 5/012* (2006.01)

(52) U.S. Cl. .................. 360/97.01; 361/685; 361/684; 360/97.02; 369/263

(58) Field of Classification Search .............. 360/97.01
See application file for complete search history.

(56) References Cited

U.S. PATENT DOCUMENTS

| | | | | |
|---|---|---|---|---|
| 5,277,615 A | * | 1/1994 | Hastings et al. | ............ 439/377 |
| 5,402,308 A | * | 3/1995 | Koyanagi et al. | ........... 361/685 |
| 5,422,767 A | | 6/1995 | Hatchett et al. | |
| 5,587,854 A | * | 12/1996 | Sato et al. | ............... 360/97.01 |
| 6,272,011 B1 | * | 8/2001 | Chen | .......................... 361/685 |
| 6,545,865 B2 | | 4/2003 | Zamora et al. | |
| 6,671,124 B2 | | 12/2003 | Guion et al. | |
| 6,683,745 B1 | * | 1/2004 | Sri-Jayantha et al. | ..... 360/97.01 |
| 7,009,835 B2 | * | 3/2006 | Desai et al. | ................ 361/683 |
| 2002/0044416 A1 | | 4/2002 | Harmon, III et al. | |
| 2003/0021058 A1 | * | 1/2003 | Gallo et al. | .............. 360/97.01 |
| 2003/0210519 A1 | | 11/2003 | Wubs | |
| 2003/0227709 A1 | * | 12/2003 | Aketagawa et al. | ...... 360/97.01 |
| 2004/0150909 A1 | * | 8/2004 | Kimura et al. | ........... 360/97.01 |

* cited by examiner

*Primary Examiner*—Wayne Young
*Assistant Examiner*—Matthew G. Kayrish
(74) *Attorney, Agent, or Firm*—Thomas R. Berthold

(57) ABSTRACT

The invention is a hard-disk-drive (HDD) assembly that includes a flame having the exterior dimensions of a particular form-factor HDD, an HDD with a form-factor smaller than the frame, a pair of mount assemblies that support the HDD entirely within the larger form-factor frame, and an electrical cable located entirely within the frame and having one end connected to the HDD and the other end exposed to the frame exterior at the position determined by the specifications of the larger form-factor. The HDD assembly thus presents a smaller form-factor HDD as a fully plug-compatible alternative to a larger form-factor HDD. The mount assemblies have spring-like cantilever arms in contact with damping material to provide a highly-damped nonlinear spring system that provides mechanical-shock resistance for the HDD in a direction normal to the planes of the disks and high stiffness in a direction parallel to the planes of the disks.

32 Claims, 6 Drawing Sheets

HARD DISK DRIVE (HDD) ASSEMBLY OF SMALL FORM-FACTOR HDD SHOCK-MOUNTED IN FRAME HAVING DIMENSIONS OF LARGER FORM-FACTOR HDD

BACKGROUND OF THE INVENTION

1. Field of the Invention

This invention relates generally to hard disk drives (HDDs), and more particularly to a system for mounting and supporting an HDD in an assembly that can be attached to a host system, such as a notebook computer.

2. Description of the Related Art

Magnetic recording hard disk drives (HDDs) are used for data storage in a wide range of host systems, including desktop and portable or notebook computers, servers, and electronic consumer devices, such as digital video recorder (DVRs) and portable MP3 players. All HDDs fall into one or more general size categories, based roughly on the diameter of the disk or disks inside the HDD. The most common HDD sizes in use today are 3.5 in., 2.5 in., 1.8 in., and 1 in. HDDs. In addition, most HDDs are manufactured to "form-factor" specifications or standards set by one or more industry-standards organizations. These specifications define the dimensions, mounting hole locations, and type and location of the electrical connector. For example, the most common form-factor in use today for 2.5 in. HDDs is the ANSI/EIA-720 form-factor standard established by the American National Standards Institute (ANSI) and Electronics Industry Association (EIA). Some HDD sizes may have more than one form-factor. For example, the 1.8 in. HDD has an ANSI/EIA form-factor as well as a Personal Computer Memory Card International Association (PCMCIA) form-factor. In addition, some HDD manufacturers may design HDDs for specialized applications that generally meet the requirements of a form-factor, such as the exterior dimensions, but have specialized features that deviate from the standard, such as the type or location of the connector.

Manufacturers of notebook computers, MP3 players and other host systems must work with these form-factor specifications when designing the method and location for attachment of the HDD to their system. Once a particular form-factor HDD has been chosen for use in the host system, it can be costly and time-consuming to re-design the host system to accommodate a smaller form-factor HDD. However, there are reasons a host system manufacturer may later want to use a smaller form-factor HDD, or may want to initially provide a system with different form-factor options for the consumer. For example, some MP3 players use a 1.8 in. HDD with a storage capacity of 40 gigabytes (GB). This capacity may be significantly more than some consumers need, so the manufacturer may want to provide the same MP3 player with a 4 GB HDD. However, HDDs with this smaller capacity are available only in a 1 in. form-factor. In another example, most notebook computers are designed for 2.5 in. HDDs. As the capacity and availability of 1.8 in. HDDs increase and their cost decreases, notebook manufactures may want to switch to this smaller form-factor HDD but do not want to redesign their computers. In addition, the host system manufacturer may desire that the smaller form-factor HDD be significantly resistant to damage from extreme mechanical shock, such as may occur if the host system is dropped.

What is needed is an HDD assembly that enables an HDD with one form-factor to meet the specifications of a larger form-factor and that provides the HDD with mechanical-shock resistance.

SUMMARY OF THE INVENTION

The invention is a hard-disk-drive (HDD) assembly that includes a frame having the exterior dimensions of a particular form-factor HDD, an HDD with a form-factor smaller than the frame and supported entirely within the larger form-factor flame, and an electrical cable located entirely within the frame and having one end connected to the HDD and the other end exposed to the frame exterior at the position determined by the specifications of the larger form-factor. The assembly thus presents a smaller form-factor HDD as a fully plug-compatible alternative to a larger form-factor HDD.

The smaller form-factor HDD is supported in the frame by a pair of mount assemblies, with each mount assembly being attached to one of the sides or ends of the HDD substantially at the HDD's height midplane (i.e., close to or at the vertical center-of-gravity of the HDD). Each mount assembly has two cantilever arms that lie substantially in the HDD's height midplane. The free ends of the cantilever arms are attached to a side or end of the frame substantially at the frame's height midplane. Damping material may be located on both sides of the cantilever arms and clamping plates used to compress the damping material against the cantilever arms when the arms are fastened to the frame. The mount assemblies with the spring-like cantilever arms and the compressed damping material thus act as a highly-damped nonlinear spring system that provides mechanical-shock resistance for the HDD in a direction normal to the planes of the disks and high stiffness in a direction parallel to the planes of the disks.

The frame may have a 2.5 in. HDD form-factor and the HDD may be a 1.8 in. HDD, with the electrical connector on the 1.8 in. HDD being along its side and the electrical connector exposed at the frame being along the frames' end, as required by the specifications of a 2.5 in HDD. In this embodiment of the invention, the 1.8 in. HDD is mounted to the frame in a position inverted (i.e., "upside down") from the position a 2.5 in. HDD would present. This inverted mounting of the HDD within the frame enables the electrical cable to be a simple flat cable with no bends but with all of its conductive traces lying in substantially the same plane, thereby permitting the cable to be located entirely inside the frame within the limits of the frame's height.

For a fuller understanding of the nature and advantages of the invention, reference should be made to the following detailed description taken together with the accompanying figures.

DETAILED DESCRIPTION OF THE INVENTION

Figure 1:
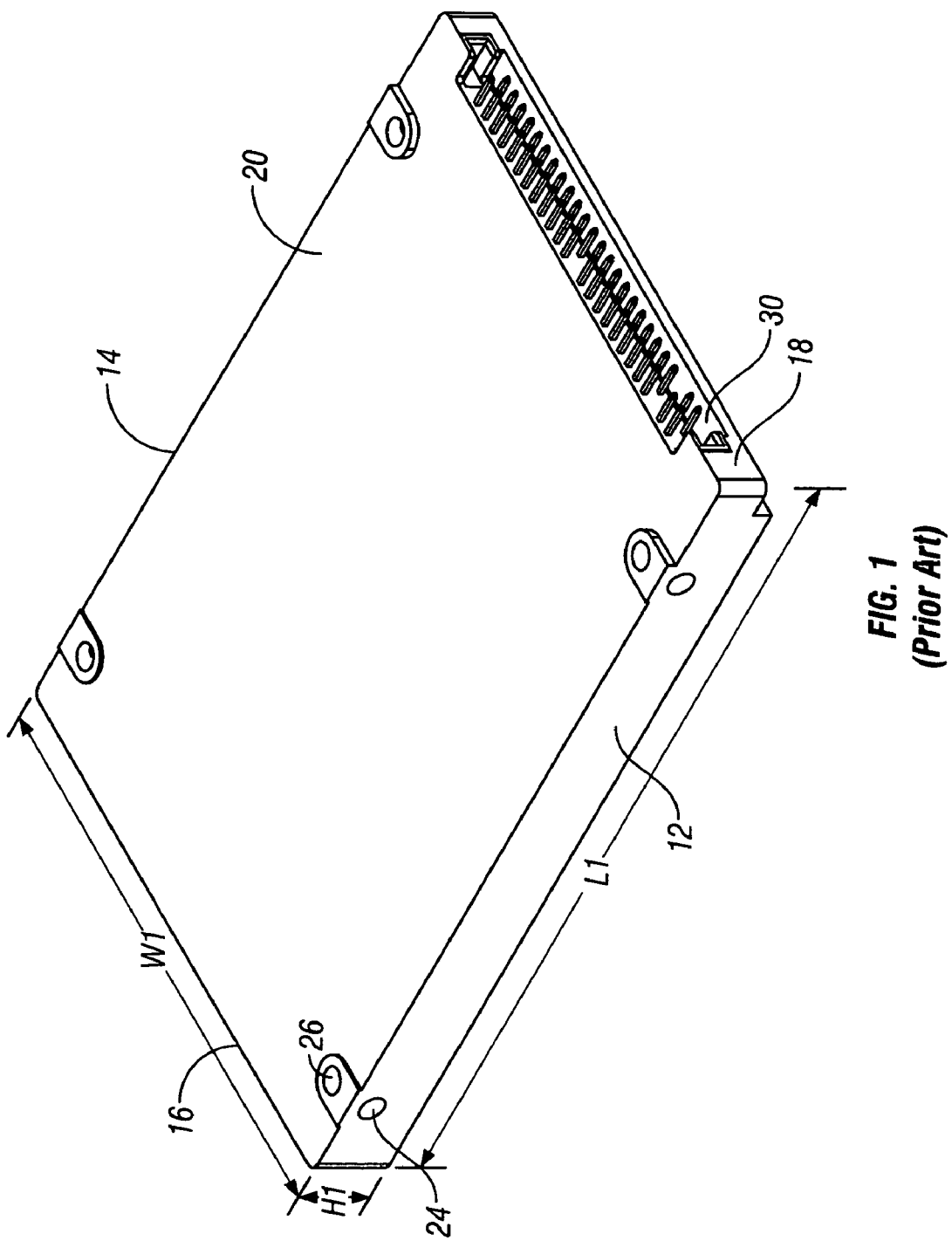
FIG. 1 is an isometric view of a 2.5 in. form-factor hard-disk-drive (HDD).

FIG. 1 is an isometric view of a 2.5 in. form-factor hard-disk-drive (HDD) as is known in the prior art. The HDD has sides 12, 14; ends 16, 18; a bottom surface 20 and a top cover (not shown). The base plate that supports the motor for the rotatable disks is the HDD "bottom". The disks are parallel to the top cover and bottom surface 20. The HDD is attached to its host system, such as a notebook computer, by screws secured into tapped holes, such as typical holes 24, 26. Electrical connection is made to the host system with a male connector pin header 30. The header 30 is shown in the "upright" configuration relative to bottom surface 20. The HDD's exterior specifications, including the dimensions of length L1, width W1 and height H1, the positioning of the header 30 at end 18, and the location of the tapped holes are all determined by industry-standard specifications. In this 2.5 in. form-factor HDD the pin header 30 is male, but in other form-factor HDDs the pin header may be female.

The 2.5 in. form-factor HDD is shown by way of example. It is typical of other industry standard form-factors, such as the larger 3.5 in. HDD and the smaller 1.8 in. HDD, in that the dimensions, hole locations, connector type and location are all determined by industry-standard specifications. Thus manufacturers of host systems must work with these specifications when designing the method and location for attachment of the HDD to their system. For example, some notebook manufacturers may use a removable "sled" that generally surrounds the HDD and is attached to the HDD through tapped holes on the end of the HDD so that the sled can be relatively easily removed for replacement of the HDD. Digital video recorder (DVR) manufacturers may design a fixed frame in a specific location in the DVR to permit easy cable connection of the HDD. Regardless of the type of host system or the method or location for attachment of the HDD to the host system, once a particular form-factor HDD has been chosen for use in the host system, it can be costly and time-consuming to re-design the host system to accommodate a smaller form-factor HDD.

The invention includes a flame having the exterior specifications of an industry-standard HDD form-factor that permits the interior mounting of an HDD with a smaller form-factor. The invention is a complete HDD assembly of the frame, a smaller form-factor HDD, internal mounts that support and provide shock resistance to the HDD, and internal cabling. The HDD assembly meets the industry-standard specifications for the larger form-factor HDD and is thus fully "plug-compatible" with the larger form-factor HDD.

Figure 2:
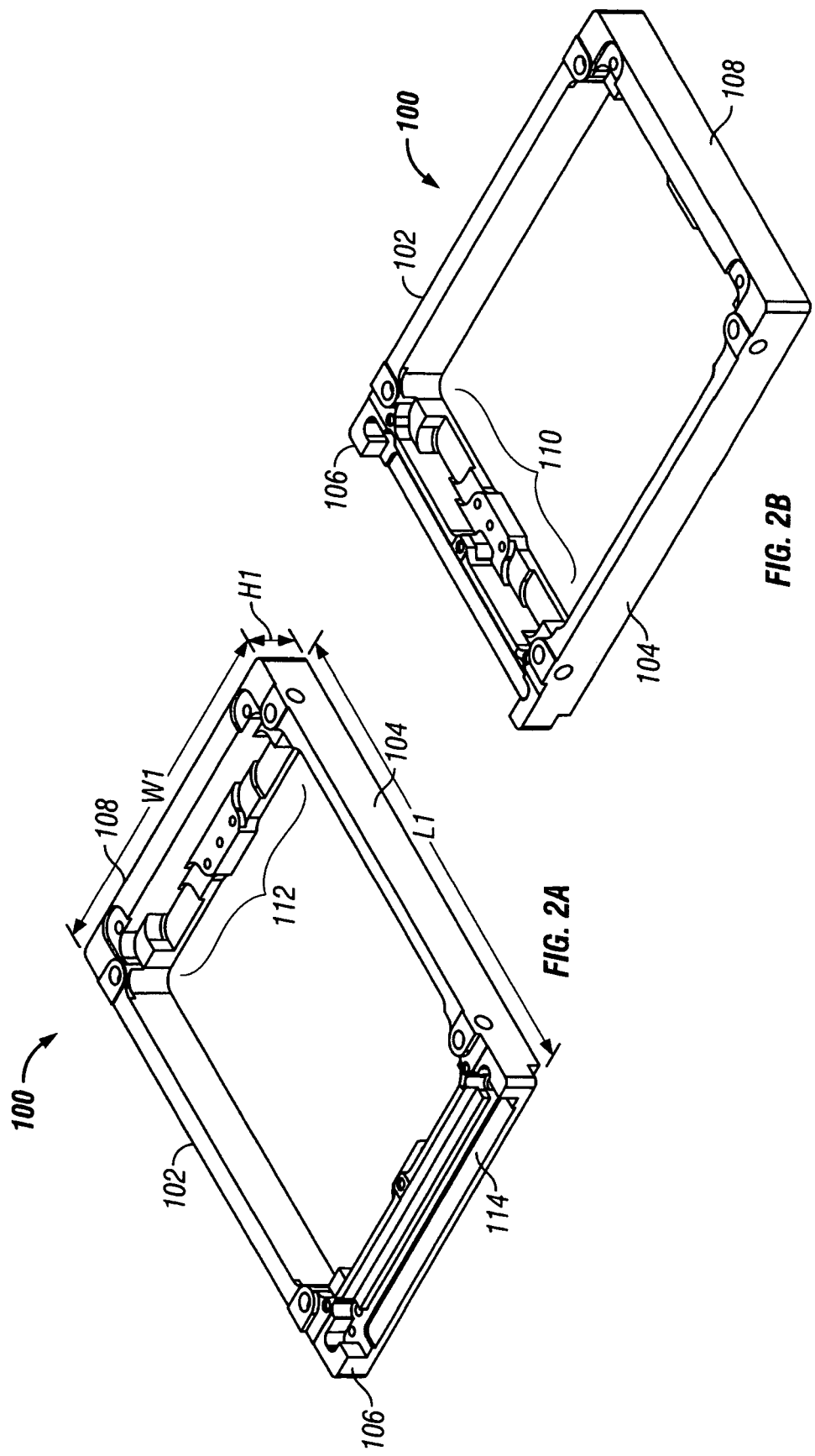
FIGS. 2A and 2B are front and rear isometric views, respectively, of the frame portion of the HDD assembly according to the invention.

FIGS. 2A and 2B are front and rear isometric views, respectively, of the flame 100. Frame 100 has the same exterior dimensions L1, W1 and H1 as a standard form-factor HDD, in this example a 2.5 in. form-factor HDD. The frame has sides 102, 104, a front end 106 and a rear end 108. A front mounting platform 110 on the inside of front end 106 and a rear mounting platform 112 on the inside of rear end 108 are used to attach the two mount assemblies that will connect the smaller form-factor HDD within the frame 100. The mounting platforms 110, 112 are located slightly below the height midplane of the frame so that when the smaller form-factor HDD is mounted its height midplane will be located at the height midplane of the frame. A flex cable is used to connect the standard connector pin header on the smaller form-factor HDD to a male pin connector header that will be attached to the front end 106 of the frame. For this reason a pin header pocket 114 is located on the outside of front end 106. The frame 100 is typically made of aluminum and manufactured by die casting. Alternatively, the frame 100 can be made of injection-molded, high-strength plastic material, such as ULTEM® resin, an amorphous thermoplastic polyetherimide, which would be a likely material for a frame used to support very small form-factor HDDs, such as the 1 in. Hitachi Microdrive®.

Figure 3:
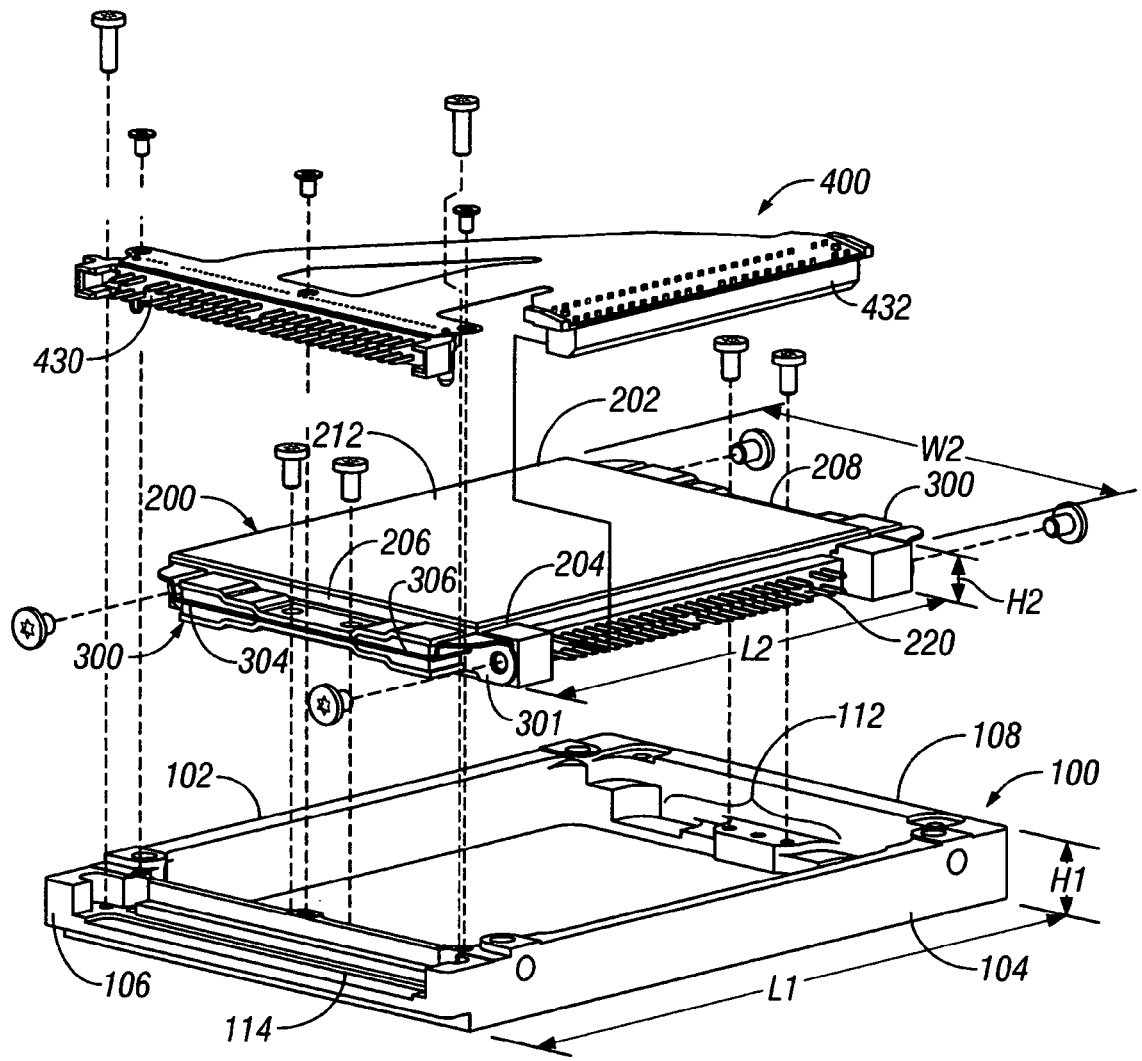
FIG. 3 is an exploded isometric view of the HDD assembly according to the invention.

FIG. 3 is an exploded isometric view of the HDD assembly of the invention. The HDD assembly includes the frame 100, the smaller form-factor HDD 200, front and rear mount assemblies 300, and an electrical cable 400. In this example the frame 100 has the exterior dimensions of a 2.5 in. form-factor HDD and the HDD 200 is a 1.8 in. form-factor HDD.

The HDD 200 has a length L2 smaller than L1, with sides 202, 204, a width W2 smaller than W1, with ends 206, 208, and a height H2 smaller than H1. HDD 200 has a male connector pin header 220 on HDD side 204. The location of the header 220 on the side of the 1.8 in. HDD, rather than on one if its ends, like in the 2.5 in. HDD, is one example of how different industry-standard specifications for different form-factor HDDs make the replacement of one form-factor HDD with a smaller form-factor HHD difficult and costly for host system manufacturers. In this 1.8 in. form-factor HDD 200 the pin header 220 is male, but in other form-factor HDDs the pin header may be female.

Each mount assembly 300 attaches one end of the HDD 200 to a corresponding end of the frame 100. As shown by the mount assembly 300 on frame end 106, the mount assembly includes a suspension member 301 that has a height no greater than the height H2 of the HDD 200 and is attached to the end 206 of HDD 200 by two screws. Suspension member 301 has a cross member 302 and two cantilever arms 304, 306 that are oriented perpendicular to cross member 302. The suspension member 301 is positioned on the HDD 200 so that the cantilever arms 304, 306 are substantially parallel to the height midplane or vertical center-of-gravity of HDD 200. The two cantilever arms have their free ends attached by screws to the corresponding frame mounting platform, e.g., mounting platform 112 located at the center of frame end 108. In this manner the HDD 200 is supported substantially at the midplane of the frame 100 with its exterior height H2 within the outer limits of frame height H1.

Figure 4:
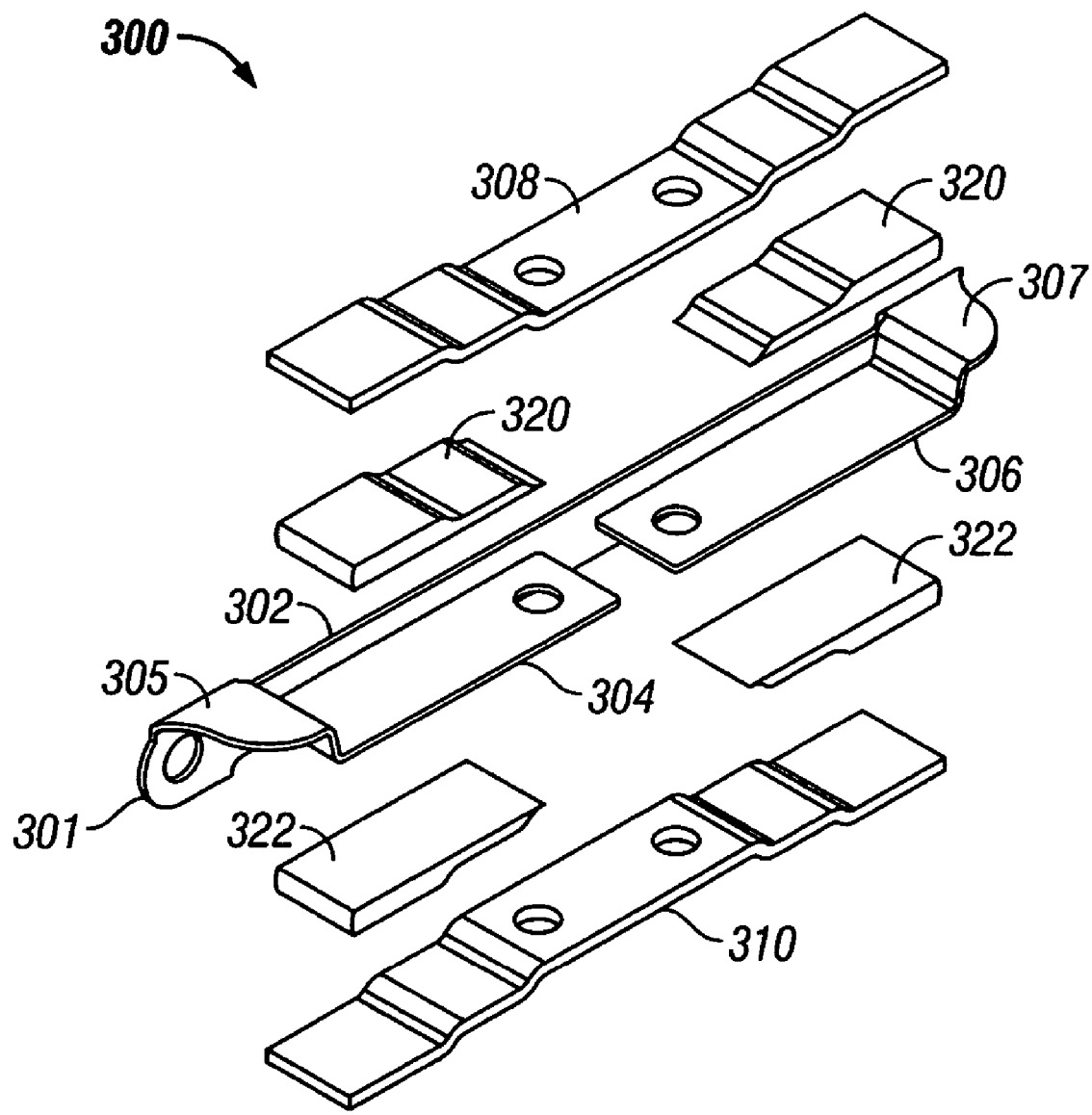
FIG. 4 is an exploded isometric view of the mount assembly portion of the HDD assembly according to the invention.

FIG. 4 is an exploded isometric view of mount assembly 300. Cantilever arm 304 is attached to cross member 302 at one end 305 of the cross member and cantilever arm 306 is attached to cross member 302 at the other end 307 of the cross member. The free end of each cantilever arm has a hole for passage of a mounting screw. The use of a mount assembly with cantilever arms that have their free ends attached to the frame allows some flexibility and slight movement of the HDD 200 within the frame 100, which improves the shock resistance of the HDD in a direction perpendicular to the planes of the disks while providing high lateral stiffness parallel to the planes of the disks. This is especially important when the HDD is used in portable host systems, typically notebook computers. The embodiment shown in FIG. 4 uses a cross member 302 that connects the fixed ends of the two cantilever arms 304, 306, which reduces shear stress at the attachment of the cross member to the ends of the HDD 200. However, the two cantilever arms 304, 306 do not need to be connected together by a cross member, but each could be separately attached at its fixed end to the HDD 200.

Preferably the mount assembly 300 should also function as a highly-damped, essentially nonlinear spring system when it optionally includes damping material located between the cantilever arms and the frame. This is shown by damping material 322 that can be placed between the cantilever arms 304, 306 and the mounting platforms 110 (FIG. 2B) and 112 (FIGS. 2A and 3) of frame 100. A bottom clamping plate 310 can be located between the damping material 322 and the mounting platforms. Alternatively, the mounting platforms 110, 112 in the frame 100 can be shaped to provide the function of bottom clamping plate 310. Additional damping material 320 can also optionally be located on top of the cantilever arms 304, 306 and secured by a top clamping plate 308. The clamping plates 308, 310 have a material composition and/or thickness so as to be stiffer than the more flexible spring-like cantilever arms 304, 306. This results in a mount assembly that is a highly-damped, essentially nonlinear spring system supporting the HDD 200 on the frame 100. Suitable materials for the cross member 302 and cantilever arms 304, 306 are steel or spring steel. A suitable material for the clamping plates 308, 310 is aluminum or steel. The damping material may be a layer of an adhesive viscoelastic material such as commercially-available, damped elastomers or polymers, which absorb energy by shear strain and/or compression, or a "soft" foam-like material, such as urethane, which absorbs energy primarily by compression. The mount assemblies thus provide a highly-damped shock mounting system for the HDD that confines the movement of the HDD in response to a mechanical shock to essentially to within the limits of H1, the height dimension of the frame. The mount assemblies thus eliminate the need for conventional elastomeric bumpers that are typically located on the exterior of the HDD.

Referring again to FIG. 3, the HDD assembly includes an electrical cable 400. Cable 400 has one end connected to the male connector pin header 220 of the HDD 200 and the other end with a male connector pin header 430 that is identical to the 2.5 in. form-factor HDD header 30 (FIG. 1). The cable end connected to header 220 on the side 204 of HDD 200 has a female connector pin header 432 that plugs into male connector pin header 220. It is understood, however, that either the male or female header can be considered a "first" type of header and that its pluggable counterpart can be considered a "second" type of header. The female header 432 fits between the side 204 of HDD 200 and the side 104 of frame 100 when assembled so that it fits entirely within the limits of frame height H1. The header 430 on the other end of cable 400 fits within frame pocket 114 and is secured to frame 100 with screws so that when assembled the frame end 106 with cable header 430 meets the specifications for a 2.5 in. form-factor HDD (see FIG. 1). A feature of the invention is that the 1.8 in. form-factor HDD 200 is mounted inverted in frame 100, i.e., surface 212 that faces up in FIG. 3 is the top cover of HDD 200 (compare with FIG. 1 where surface 20 is the bottom of the 2.5 in. HDD). Thus the male connector pin header 220 on HDD 200, while being identical to the male connector pin header 430, is inverted relative to header 430. This inverted mounting of the HDD 200 within the frame 100 enables the flex cable 400 to be a simple flat cable with no bends but with all of its conductive traces that connect the pins in the male header 430 with like pins in male header 220 lying in substantially the same plane. The flat flex cable 400 with its two headers 430, 432 can thus be located entirely inside the frame 100 within the limits of frame height H1.

Figure 5:
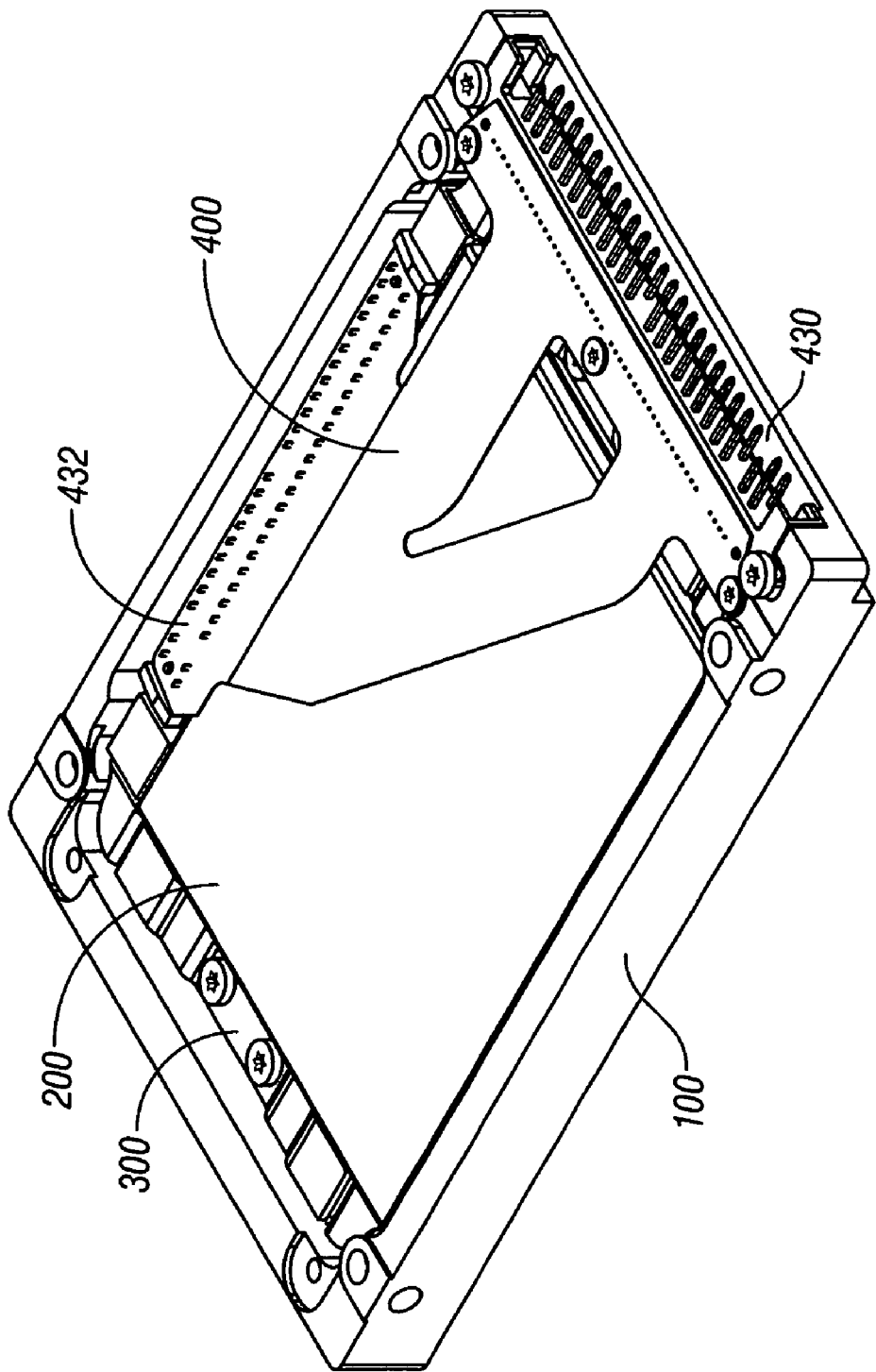
FIG. 5 is an isometric view showing the fully-assembled HDD assembly according to the invention.

FIG. 5 is an isometric view showing the fully-assembled HDD assembly.

Figure 6:
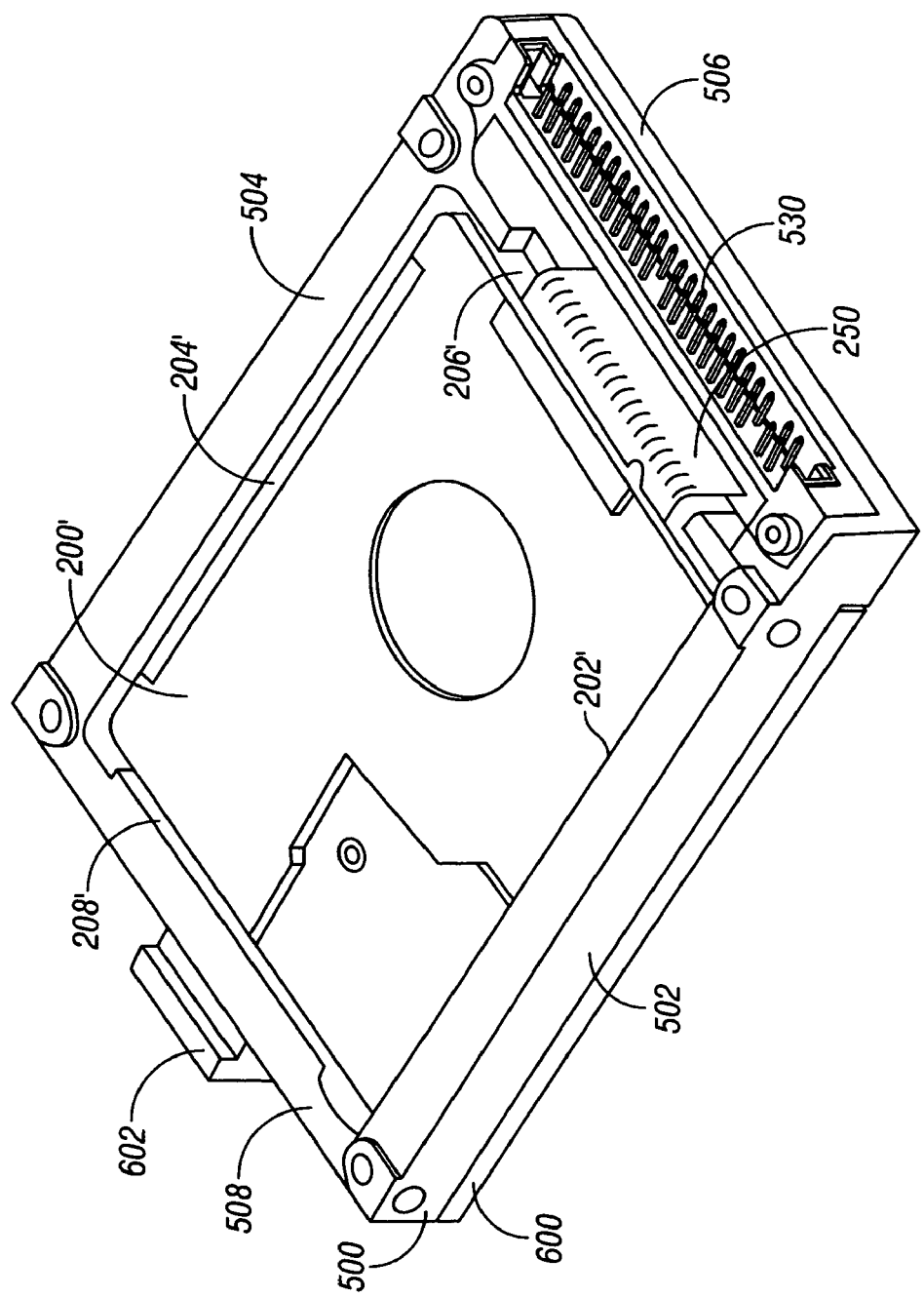
FIG. 6 is an isometric view of an HDD assembly according to the invention with a specialized HDD that has exterior dimensions substantially corresponding to those of a smaller form-factor HDD, but with a flex cable that extends along an end of the HDD.

In the HDD assembly described above, the mount assemblies are located at the ends of the HDD and frame. This is because of the location of male connector pin header 200 on the side of HDD 200 and the requirement of the 2.5 in. form-factor that the male connector pin header be located on the end. However, other types of HDDs can be supported along their sides instead of their ends. FIG. 6 shows an HDD assembly according to the invention with a specialized HDD 200' that has exterior dimensions substantially corresponding to those of a 1.8 in. form-factor HDD, but with a flex cable 250 that extends along an end 206'. HDD 200' is supported by the previously-described mount assemblies within a frame 500 with ends 506, 508 and sides 502, 504 and having a 2.5 in. form-factor. The mount assemblies are attached to the sides 202', 204' of HDD 200'. Bottom clamping plates, such as clamping plate 600, form part of the exterior of the frame 500 and compress the damping material 322 of the mount assemblies 300 against the cantilever arms 304, 306 (FIG. 4). One end of flex cable 250 has a flat cable interface connection to an end of HDD 200' and the other end connects to the male pin connector header 530 that is exposed at the end 506 of frame 500. The HDD assembly shown in FIG. 6 has a handle 602 incorporated into the frame 500 for easy removal from a notebook computer.

While the invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A hard-disk-drive (HDD) assembly comprising:
    a frame having exterior dimensions of length L1, width W1 and height H1;
    an HDD having an exterior height H2 less than H1;
    a pair of mount assemblies paired with and attached to either the sides of the frame or the ends of the frame and supporting the HDD within the frame with the HDD's height midplane being substantially coplanar with the frame's height midplane, thereby providing a spacing between the HDD's exterior height and the frame's exterior height, each mount assembly including a cantilever arm with its free end attached to the frame, the mount assemblies permitting movement of the HDD in the direction perpendicular to the plane of the disk and providing relatively high stiffness parallel to the plane of the disk; and
    an electrical cable within the interior of the frame and having one end connected to the HDD and the other end exposed to the frame exterior.

2. The assembly of claim i wherein the frame's exterior dimensions substantially correspond to the exterior dimensions of a first HDD form-factor, and wherein the HDD has exterior dimensions substantially corresponding to a second HDD form-factor smaller than the first HDD form-factor.

3. The assembly of claim 2 wherein the frame's exterior dimensions substantially correspond to the exterior dimensions of a 2.5 in. HDD form-factor, and wherein the HDD has exterior dimensions substantially corresponding to a 1.8 in. form-factor.

4. The assembly of claim 1 wherein the frame has two ends along its width W1 and two sides along its length L1; wherein the HDD has an exterior width W1, an exterior length L2, two ends along its width W2 and two sides along its length L2; and wherein the HDD is supported within the interior of the frame with its sides substantially parallel to the sides of the frame.

5. The assembly of claim 4 wherein the cable end connected to the HDD is connected to the HDD at an HDD side and wherein the cable end exposed to the frame exterior is located at one of the frame's ends.

6. The assembly of claim 5 wherein the HDD includes a first connector pin header on its HDD side, wherein the cable end connected to the HDD includes a second connector pin header connected to said first connector pin header, and wherein the cable end located at one of the frame's ends includes a connector pin header like said first connector pin header.

7. The assembly of claim 6 wherein the connector pin header at the frame end is attached to the frame.

8. The assembly of claim 7 wherein the connector pin header attached to the frame and said first connector pin header on the side of the HDD have the same pin configuration, and wherein the HDD is supported within the frame with said first connector pin header inverted from the connector pin header attached to the frame.

9. The assembly of claim 4 wherein the cable end connected to the HDD is connected to the HDD at an HDD end and wherein the cable end exposed to the frame exterior is located at one of the frame's ends.

10. The assembly of claim 9 wherein the cable end connected to the HDD is a flat cable interface, and wherein the cable end located at one of the frame's ends includes a male connector pin header.

11. The assembly of claim 1 wherein each mount assembly has a height no greater than H2.

12. The assembly of claim 1 wherein each mount assembly includes damping material.

13. The assembly of claim 1 wherein each mount assembly comprises a cross member attached to the HDD substantially at the HDD height midplane, wherein said cantilever arm is a first cantilever arm extending from one end of the cross member, and further comprising a second cantilever arm extending from the other end of the cross member and having its free end attached to the frame, the free end of each cantilever arm being attached to the frame substantially at the frame height midplane.

14. The assembly of claim 13 wherein each mount assembly further comprises damping material located between each cantilever arm and the frame.

15. The assembly of claim 14 wherein the damping material is a layer of viscoelastic material.

16. The assembly of claim 14 wherein the damping material is a layer of soft foam material.

17. The assembly of claim 13 wherein each mount assembly further comprises damping material and a clamping plate, the damping material being located between the clamping plate and the cantilever arms.

18. The assembly of claim 13 wherein each mount assembly further comprises:
first and second clamping plates, the cantilever arms being located between the clamping plates;
a first layer of damping material between the first clamping plate and the cantilever arms; and
a second layer of damping material between the second clamping plate and the cantilever arms.

19. The assembly of claim 18 wherein each mount assembly further comprises a fastener for attaching the mount assembly to the frame, the fastener compressing the damping material between the clamping plates and cantilever arms.

20. A hard-disk-drive (HDD) assembly comprising:
a frame having exterior dimensions of length L1, width W1 and height H1;
an HDD having an exterior height H2 less than H1;
a pair of mount assemblies supporting the HDD within the frame with the HDD's height midplane being substantially coplanar with the frame's height midplane, the mount assemblies being paired with and attached to either the sides of the frame or the ends of the frame; each mount assembly having a height no greater than H2 and comprising a cantilever arm extending substantially coplanar with the HDD's height midplane and having its fixed end attached to the HDD and its free end attached to the frame, and damping material between the cantilever arm and the frame; and
an electrical cable within the interior of the frame and having one end connected to the HDD and the other end exposed to the frame exterior.

21. The assembly of claim 20 wherein each mount assembly further comprises two cantilever arms and a cross member attached to the HDD substantially at the HDD's height midplane, the fixed end of each cantilever free end being attached to an end of the cross member and the free end of each cantilever arm being attached to the frame substantially at the frame's height midplane.

22. The assembly of claim 21 wherein each mount assembly further comprises a clamping plate, the damping material being located between the clamping plate and the cantilever arms.

23. The assembly of claim 21 wherein each mount assembly further comprises first and second clamping plates, the cantilever arms being located between the clamping plates; and wherein the damping material includes a first layer of damping material between the first clamping plate and the cantilever arms and a second layer of damping material between the second clamping plate and the cantilever arms.

24. The assembly of claim 23 wherein each mount assembly further comprises a fastener for attaching the mount assembly to the frame, the fastener compressing the damping material between the clamping plates and cantilever arms.

25. The assembly of claim 20 wherein the damping material is a layer of viscoelastic material.

26. The assembly of claim 20 wherein the damping material is a layer of soft foam material.

27. The assembly of claim 20 wherein the frame's exterior dimensions substantially correspond to the exterior dimensions of a first HDD form-factor, and wherein the HDD has exterior dimensions substantially corresponding to a second HDD form-factor smaller than the first HDD form-factor.

28. The assembly of claim 27 wherein the frame's exterior dimensions substantially correspond to the exterior dimensions of a 2.5 in. HDD form-factor, and wherein the HDD has exterior dimensions substantially corresponding to a 1.8 in. form-factor.

29. The assembly of claim 20 wherein the frame has two ends along its width W1 and two sides along its length L1; wherein the HDD has an exterior width W1, an exterior length L2, two ends along its width W2 and two sides along its length L2; wherein the HDD is supported within the interior of the frame with its sides substantially parallel to the sides of the frame; and wherein the cable end connected to the HDD is connected to the HDD at an HDD side; and wherein the cable end exposed to the frame exterior is located at one of the frame's ends.

30. The assembly of claim 29 wherein the HDD includes a first connector pin header on its HDD side, wherein the cable end connected to the HDD includes a second connector pin header connected to the HDD's first connector pin header, and wherein the cable end located at one of the frame's ends includes a connector pin header like said first connector pin header.

31. The assembly of claim 30 wherein the connector pin header at the frame end is attached to the frame.

32. The assembly of claim 31 wherein the connector pin header attached to the frame and said first connector pin header on the side of the HDD have the same pin configuration, and wherein the HDD is supported within the frame with said first connector pin header inverted from the connector pin header attached to the frame.

* * * * *